United States Patent
Slyz et al.

(10) Patent No.: US 7,716,414 B2
(45) Date of Patent: May 11, 2010

(54) METHOD FOR UPDATING A MOBILE DEVICE USING AN UPDATE PACKAGE OBTAINED FROM A REMOTE SERVER

(75) Inventors: Marko Slyz, Dana Point, CA (US); Shao-Chun Shen, Irvine, CA (US); LaShawn McGhee, Temecula, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 308 days.

(21) Appl. No.: 11/732,267

(22) Filed: Apr. 2, 2007

(65) Prior Publication Data
US 2008/0098160 A1  Apr. 24, 2008

Related U.S. Application Data

(60) Provisional application No. 60/787,873, filed on Mar. 31, 2006.

(51) Int. Cl.
*G06F 12/00* (2006.01)
(52) U.S. Cl. .................... 711/103; 717/173
(58) Field of Classification Search ............... 717/173; 711/103, 170, 154
See application file for complete search history.

(56) References Cited

U.S. PATENT DOCUMENTS

| | | | | |
|---|---|---|---|---|
| 5,774,715 | A * | 6/1998 | Madany et al. | 707/101 |
| 5,901,310 | A * | 5/1999 | Rahman et al. | 713/1 |
| 6,421,776 | B1 * | 7/2002 | Hillis et al. | 713/2 |
| 2003/0023964 | A1 | 1/2003 | Rajaram et al. | |
| 2003/0046485 | A1 * | 3/2003 | Zitlaw | 711/105 |
| 2004/0098715 | A1 * | 5/2004 | Aghera et al. | 717/173 |
| 2006/0236325 | A1 * | 10/2006 | Rao et al. | 719/315 |
| 2007/0093243 | A1 * | 4/2007 | Kapadekar et al. | 707/8 |

FOREIGN PATENT DOCUMENTS

| | | |
|---|---|---|
| EP | 1333375 | 6/2003 |
| WO | WO2004066091 | 8/2004 |
| WO | WO2004109510 | 12/2004 |

OTHER PUBLICATIONS

European Patent Office, Patent Cooperation Treaty, International Search Report, PCT/US2007/008415, Sep. 5, 2007.

Klein, Shmuel T.; "Compressed Delta Encoding for LZSS Encoded Files"; 2007 Data Compression Conference, 0-7695-2791-4/07, 2007 IEEE, IEEE Computer Society, Downloaded on May 1, 2009 at 18:45 from IEEE Xplore; 10 pgs.

* cited by examiner

*Primary Examiner*—Pierre-Michel Bataille

(57) ABSTRACT

Methods and devices generating and processing update packages containing multiple updates for updating compressed firmware and file systems in an electronic device.

15 Claims, 14 Drawing Sheets

METHOD FOR UPDATING A MOBILE DEVICE USING AN UPDATE PACKAGE OBTAINED FROM A REMOTE SERVER

The present application makes reference to U.S. Provisional Application Ser. No. 60/787,873 entitled "MOBILE DEVICE CAPABLE OF MULTIPLE UPDATES", filed Mar. 31, 2006, the complete subject matter of which is hereby incorporated herein by reference, in its entirety.

In addition, the present application makes reference to U.S. Provisional Patent Application Ser. No. 60/249,606, entitled "System and Method for Updating and Distributing Information," filed Nov. 17, 2000, and International Patent Application Publication No. WO 02/41147 A1, entitled "System And Method For Updating And Distributing Information", filed Nov. 19, 2001, and having publication date Mar. 23, 2002, the complete subject matter of each of which is hereby incorporated herein by reference, in its entirety.

BACKGROUND OF THE INVENTION

Non-volatile memory is employed in a wide variety of electronic devices such as, for example, mobile handsets, cellular phones, personal digital assistants (PDA's), pagers and handheld personal computers. The non-volatile memory in these devices typically contains firmware, application software, data, and configuration information that makes the devices operational, and may be provided by the manufacturers of the electronic devices, by system operators of telecommunication carrier networks, or by third party developers. If defects are found in such firmware/software, or if new features are to be added to such devices, the software and/or firmware in the affected electronic devices may need to be updated. Errors and/or interruptions that may occur during the updating of such operational code may leave the electronic device in a partly or completely non-functional state. To avoid this problem, present methods of updating such software and/or firmware typically involve returning the electronic device to the manufacturer, to the system operator, or to the third party, so that an update of memory contents may be performed using a direct connection to the electronic device. This is both costly and inconvenient to both the user of the electronic device, and to one performing the update.

Firmware, software, data, and configuration information is sometimes stored in compressed form in electronic devices such as those mentioned above, to save the cost of additional memory devices. File systems supported by operating systems in such electronic device may also employ compression/decompression techniques, to enable them to store content at a lower cost per byte.

Further limitations and disadvantages of conventional and traditional approaches will become apparent to one of skill in the art, through comparison of such systems with the present invention as set forth in the remainder of the present application with reference to the drawings.

DETAILED DESCRIPTION OF THE INVENTION

Aspects of the present invention relate generally to a method and device supporting the updating of memory in electronic devices, and more specifically, to a method and device that supports the processing of multiple updates received in a single package of update information that comprises updates for firmware, software and file systems in memory of an electronic device such as, for example, non-volatile FLASH-type memory. While the following discussion focuses primarily on mobile electronic devices such as, for example, a mobile handset, a cellular phone, a personal digital assistant, a pager, and a handheld personal computer, this is by way of example and not by way of specific limitations of the present invention. The teaching contained herein may also be applicable to a variety of other electronic devices having a processor and memory containing software, firmware, configuration information, data files, and the like, for which updating of memory contents may be desirable.

Representative embodiments of the present invention may be employed during updates using wired or wireless communication links such as, for example, a public switched telephone network, a wired local or wide area network, an intranet, the Internet, and wireless cellular, paging, local area, personal area, and short range networks such as those referred to as WiFi, IEEE 802.11a/b/g/n compatible networks, the short range wireless technology known as Bluetooth, and similar types of communication links.

In a representative embodiment of the present invention, information for updating memory in an electronic device such as those described above may be communicated using, for example, an update package comprising a set of instructions executable by firmware and/or software in the electronic device to transform or convert an existing version of software, firmware, and/or data in the electronic device into a new or updated version of the software, firmware, and/or data.

Figure 1:
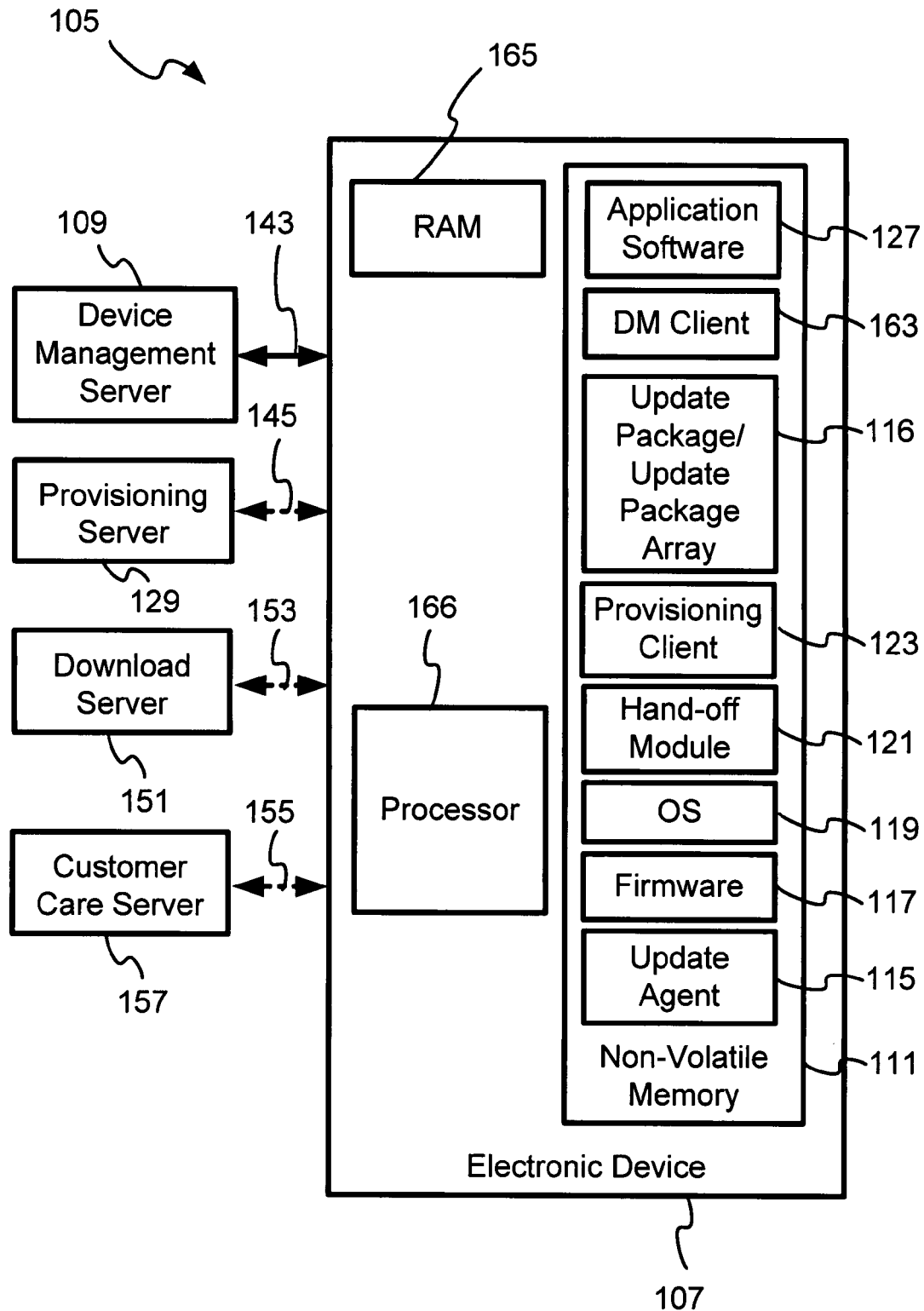
FIG. 1 is a perspective block diagram of an exemplary network that supports remote update of non-volatile memory of an electronic device such as, for example, a mobile handset or personal digital assistant, in accordance with a representative embodiment of the present invention.

FIG. 1 is a perspective block diagram of an exemplary network 105 that supports remote update of non-volatile memory of an electronic device 107 such as, for example, a mobile handset or personal digital assistant, in accordance with a representative embodiment of the present invention. The electronic device 107 may, for example, comprise a cellular phone, a personal digital assistant (PDA), a pager, a handheld personal computer (PC), and/or the like. The electronic device 107 may support a number of features and/or applications that may contain software/firmware errors that need to be corrected, or that may provide additional features/benefits by updating the software/firmware. The electronic device 107 may itself be used to request updates to software/firmware via a customer care server 157 either directly, using a browser in the electronic device 107, or via a customer service representative (CSR). A CSR may, for example, provide service to the customer using the electronic device 107 by retrieving, as necessary, one or more diagnostic management objects (MOs) stored in memory of the electronic device 107, and by transmitting to the electronic device 107 from a remote server, update information in the form of, for example, one or more update packages. Such update packages may, for example, comprise instructions to code in the electronic device 107 to convert or transform a first version of software/firmware to a second version of software/firmware, in the electronic device 107, in addition to metadata, and checksum information.

As shown in the illustration of FIG. 1, the network 105 in a representative embodiment of the present invention may comprise the electronic device 107, a device management (DM) server 109, a provisioning server 129, a customer care server 157, and a download server 151. Although not illustrated in FIG. 1, a representative embodiment of the present invention may also comprise other application servers such as, for example, a diagnostics server, and a self-care website/portal. The electronic device 107 of FIG. 1 is able to communicate with the DM server 109, the download server 151, the customer care server 157, and the provisioning server 129 via communication paths 143, 153, 155 and 145, respectively. Although the communication paths 143, 153, 155, 145 are illustrated as being separate paths between the electronic device 107 and their respective servers, this is only for purpose of illustration, and is not a specific limitation of a representative embodiment of the present invention. The communication paths 143, 153, 155, 145 may be combined into one or more paths that may comprise wired or wireless communication paths such as, for example, a local area network, a public switched telephone network, a wireless personal, local or wide area network, and a cellular or paging network, to name only a few possibilities.

As illustrated in FIG. 1, an electronic device in accordance with a representative embodiment of the present invention may comprise a processor 166, random access memory (RAM) 165, and non-volatile memory (NVM) 111. The NVM 111 may comprise, for example, NAND or NOR type flash memory or other suitable type of NVM. The NVM 111 may contain a number of software/firmware code components of the electronic device 107 including, for example, application software 127, a device management (DM) client 163, an update package/update package array 116, a provisioning client 123, a hand-off module 121, an operating system (OS) 119, firmware 117, and one or more update agent(s) 115. Additional software/firmware code components may also be present in the RAM 165 and NVM 111. The term "code" may be used herein to represent one or more of executable instructions, operand data, configuration parameters, and other information stored in memory of the electronic device 107, and the term "update package catalog" may be used interchangeably with the term "update package array" to refer to received update information that comprises multiple update packages.

In a representative embodiment of the present invention, an electronic device such as, for example, the electronic device 107 of FIG. 1 may employ an update package (e.g., the update package/update package array 116) delivered by a remote server such as, for example, the download server 151, to update firmware/software, data and configuration information in memory of the electronic device 107. Such an update package may comprise update information including, for example, metadata describing an update, checksums, and instructions executable by one or more update agents such as, for example, the update agent 115 of FIG. 1. The update agent 115 may process a set of executable instructions, which may be used as a compact means to encode differences between existing/first and updated/second versions of firmware, software, data, and configuration parameters for the electronic device 107. The executable instructions may be assembled into update packages to be transmitted to an electronic device for use in updating memory of the electronic device. Update agent(s) in the electronic device may process respective portions of the executable instructions from an update package to convert/transform corresponding portions of an existing/first version of code in memory of the electronic device 107 to portions of an updated/second version of code. The electronic device 107 may also receive provisioning information from, for example, the device management server 109, the customer care server 157, and/or the provisioning server 129 to fix configuration problems or reconfigure software and hardware.

In addition to those elements described above, the electronic device 107 may comprise a downloaded diagnostic client (not shown) that facilitates remote diagnosis, and a traps client (not shown) that facilitates the setting of traps and retrieving of collected information. The DM client 163 of the electronic device 107 may interact with the DM server 109, the diagnostic client, and the traps client, to receive DM commands from the DM server 109 and to implement them in the electronic device 107. The download server 151 may be employed to download firmware and software updates (e.g., update information in the form of, for example, update packages). The download server 151 may also be used to download new firmware/software such as, for example, the diagnostics client mentioned above, which may then be installed and activated in the electronic device 107.

As described briefly above, an electronic device in accordance with a representative embodiment of the present invention (e.g., electronic device 107) may receive update information (e.g., an update package) for processing by one or more update agents (e.g., update agent 115) to convert/transform software (e.g., application software 127) and/or firmware (e.g., firmware 117) to produce updated software/firmware in the electronic device. In some representative embodiments of the present invention, the update agent 115 may comprise multiple update agents, each of the update agents appropriately arranged to process different types of update information for updating different types/formats of software, firmware, user data, and configuration parameters in the memory of the electronic device 107. Each of the update packages received may be processed in the electronic device by an appropriate one of the update agent(s) 115 to update an associated type of information in the memory of the electronic device 107.

Figure 2:
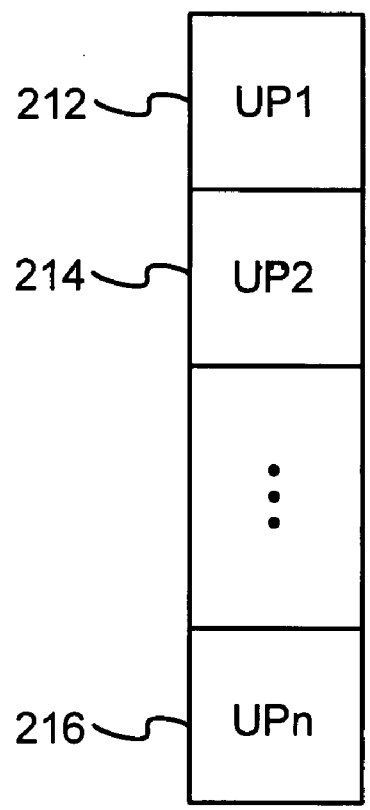
FIG. 2 shows a block diagram of an exemplary update package array 200 that may correspond to, for example, the update package array of FIG. 1, and that comprises multiple update packages UP1 through UPn that may each be processed by a corresponding update agent in an electronic device such as, for example, the electronic device of FIG. 1, in accordance with a representative embodiment of the present invention.

FIG. 2 shows a block diagram of an exemplary update package array 200 that may correspond to, for example, the update package array 116 of FIG. 1, and that comprises multiple update packages UP1 212 through UPn 216 that may each be processed by a corresponding update agent in an electronic device such as, for example, the electronic device 107 of FIG. 1, in accordance with a representative embodiment of the present invention. An update package array such as the update package array 200 of FIG. 2 may, for example, be delivered over-the-air (OTA) by a remote server (e.g., the download server 151) and stored in memory of the electronic device (e.g., electronic device 107) for later processing. Although not shown in FIG. 2, the update package array 200 may contain information in addition to the update packages UP1 212 through UPn 216 such as, for example, metadata information identifying the update packages present and their types, and checksum information, to name just a few items.

As mentioned above, a representative embodiment of the present invention may comprise a handoff module such as, for example, the hand-off module 121 of FIG. 1 that interfaces between a device management client, such as the device management (DM) client 163, and update agents such as, for example, the update agent 115. One example of a DM client is the MVA client developed by Bitfone Corporation. The hand-off module 121 may manage the handling of update packages/update package arrays by fielding requests from the DM client 163, splitting the update package array into its constituent update packages, invoking the appropriate one(s) of the update agent(s) 115, and returning a response to the DM client indicating the outcome. The DM client may then communicate information identifying the updates performed and the outcome to a remote server such as, for example, the DM server 109.

In a representative embodiment of the present invention, multiple update packages may, for example, be generated and later combined into an update package array by a generator utility operated by a system operator, a manufacturer of the electronic device 107, or a third party. The resulting update package array(s) may be distributed over-the-air (OTA) to the electronic device 107 by a remote server such as, for example, the download server 151 or device management server 109 of FIG. 1. An example of one such a generator utility is the mProve® Generator by Bitfone Corporation.

In a representative embodiment of the present invention, a code component referred to herein as a hand-off module, represented in FIG. 1 as hand-off module 121, may be employed to split the combined UP (i.e., the update package array) and to invoke an appropriate update agent such as the update agent 115 of FIG. 1, for example, to perform an update for each update package in the update package array, in sequence. In one representative embodiment, such a hand-off module may receive scheduling information for updating each update package, from the device management client 163, and the electronic device 107 may report the completion of all updates to the device management client 163. In another representative embodiment of the present invention, the hand-off module 121 may itself schedule the performance of each update, and the hand-off module 121 may report the completion of each update.

Figure 3:
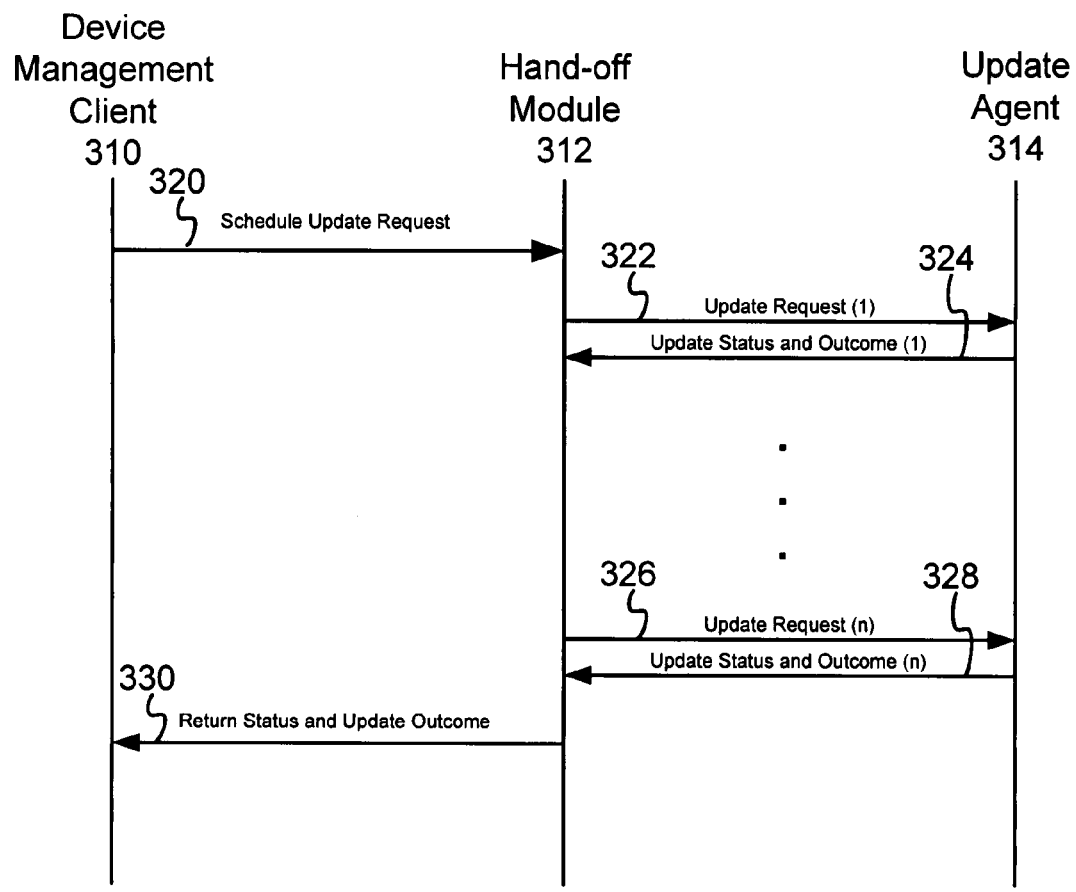
FIG. 3 illustrates an exemplary exchange of messages or control between a device management client, a hand-off module, and one or more update agents during processing of an update package array such as, for example, the update package array of FIG. 2, in accordance with a representative embodiment of the present invention.

FIG. 3 illustrates an exemplary exchange of messages or control between a device management client 310, a hand-off module 312, and one or more update agents 314 during processing of an update package array such as, for example, the update package array 200 of FIG. 2, in accordance with a representative embodiment of the present invention. The device management client 310, hand-off module 312, and update agent 314 of FIG. 3 may, for example, correspond to the device management client 163, the hand-off module 121, and the update agent 115, of FIG. 1, respectively. To initiate processing of an update package array, a device management client in accordance with a representative embodiment of the present invention may communicate a schedule update request 320 to the hand-off module 312. The schedule update request 320 may be communicated using an access function in the hand-off module 121 that is directly called by the device management client 310, or may be communicated using some form of messaging. This may occur, for example, each time the device management client 310 is initialized (e.g., at startup). The hand-off module 312 may then invoke or send a message to an update agent for the first update package in the received update package array, by issuing an update request (1) 322 to an appropriate update agent 314. The update agent 314, upon completing processing of the update package may send or return update status and outcome (1) 324. The update package array may comprise a number of update packages that are each processed in a similar fashion. In due time, the hand-off module 312 may process the last of the update packages in the update package array by invoking or messaging an update agent to process the last of the update packages by issuing an update request (n) 326 to the appropriate update agent 314. Upon completing processing of the update package, the update agent 314 may send or return update status and outcome (n) 328. The hand-off module 312 may then message or return status and update outcome information 330 to the device management client 310 to report the results of the updating activities. The hand-off module 312 may return different status values depending upon the scenario.

In a representative embodiment of the present invention, a number of different scenarios may occur when the device management client 310 requests hand-off module 312 to perform an update. In a first scenario, the hand-off module 312 may determine that there is no update package/update package array stored in memory of the electronic device (e.g. electronic device 107), and that no update is to be performed or in progress. In this case, the hand-off module 312 may send a return status to the device management client 310 that indicates no update is required.

In a second scenario, the hand-off module 312 may detect that an update package/update package array is stored in memory of the electronic device, that zero or more of the updates from the update package/update package array have been completed, and that at least one update package remains to be processed. In this case, the hand-off module 312 may split the update package/update package array, initiates the next update, and may send a return status to the device management client 310 that indicates an update is in progress.

In a third scenario, the hand-off module 312 may determine that an update package/update package array is stored in memory of the electronic device, that processing of all of the updates in the update package/update package array has completed, and may return status of "update completed" and an update outcome of "success" to the device management client, if all updates were successful, or "failure", if any updates failed. A record may be made that update outcome has been reported to the device management client.

In a fourth scenario, the hand-off module 312 may determine that an update package/update package array is stored in memory of the electronic device, that processing of all of the updates in the update package/update package array has completed, and that the hand-off module 312 has already provided the return status and update outcome for this update package/update package array to the DM client 310. It may then provide a return status indicating "status already reported", and an update outcome indicating "success", if all updates completed successfully, or "failure", if any updates failed.

Some representative embodiments of the present invention may report return status and update outcome to the device management client 310 after all update packages in the update package array have been processed. Other representative embodiments of the present invention may report return status and update outcome after the completion of processing of each update package in the update package array.

An electronic device in accordance with a representative embodiment of the present invention may comprise non-volatile and volatile memory such as, for example, the NVM 111 and volatile memory 165 of FIG. 1 that is used for the storage of update information, software, firmware, user data and configuration parameters used in the operation of the electronic device 107. Some of this digital information may be stored in a file system supported by an operating system (O/S) such as, for example, the O/S 119 of FIG. 1. Because the total amount of update information, software, firmware, user data and configuration parameters needed by the electronic device 107 may be large, the digital information may be stored in a compressed form, and code in the electronic device 107 may decompress compressed information prior to its use. The use of compressed storage adds a level of complexity to the task of updating the contents of the memory in electronic device 107.

A representative embodiment of the present invention may support performing updates upon such compressed information in memory of the electronic device 107 such as, for example, compressed firmware and compressed file systems. A handoff module in such an embodiment may, for example, determine the type of update to be performed, and may invoke an update agent specifically enabled to update compressed firmware and/or compressed file system content in the electronic device 107.

In a representative embodiment of the present invention, a compression module used to compress and decompress firmware and file system content may be easily replaced to allow for updates as compression technology advances. This permits end users of a representative embodiment of the present invention to create their own compression modules.

In a representative embodiment of the present invention, the ability to employ compressed firmware updates is enabled by two firmware/software components, a generator used to generate update packages, and an update agent in the electronic device such as, for example, the update agent 115 in the electronic device 107. In order to work together to create and apply a compressed firmware update, the generator and the update agent may employ a common compression format. In a representative embodiment of the present invention, the generator and the update agent may interface with a compression module whose algorithms are used for compression and decompression of individual blocks of memory.

Those of ordinary skill in the art will, upon studying the teachings of this disclosure, appreciate that the fault tolerant update of compressed firmware and/or software in an electronic device is not simply a matter of compressing and decompressing an entire memory image. A representative embodiment of the present invention may create a compressed firmware image for storage in non-volatile memory of an electronic device (e.g., the electronic device 107) and updated using a compressed firmware update feature, by first compressing all version binaries using a compression module. The compression module may create the compressed binaries in a specified format. Creating these compressed binary images may be part of the build process used when creating firmware/software for the electronic device 107.

Because developers of firmware/software for the electronic device 107 may create compressed binary images with a stand alone build tool/process, and because the generator used to create update information (e.g., update packages) may execute a stand alone compression module during its operation, a compression module in accordance with a representative embodiment of the present invention may have multiple interfaces to enable the same executable to be used by both the build tool/process and with the generator.

Figure 4:
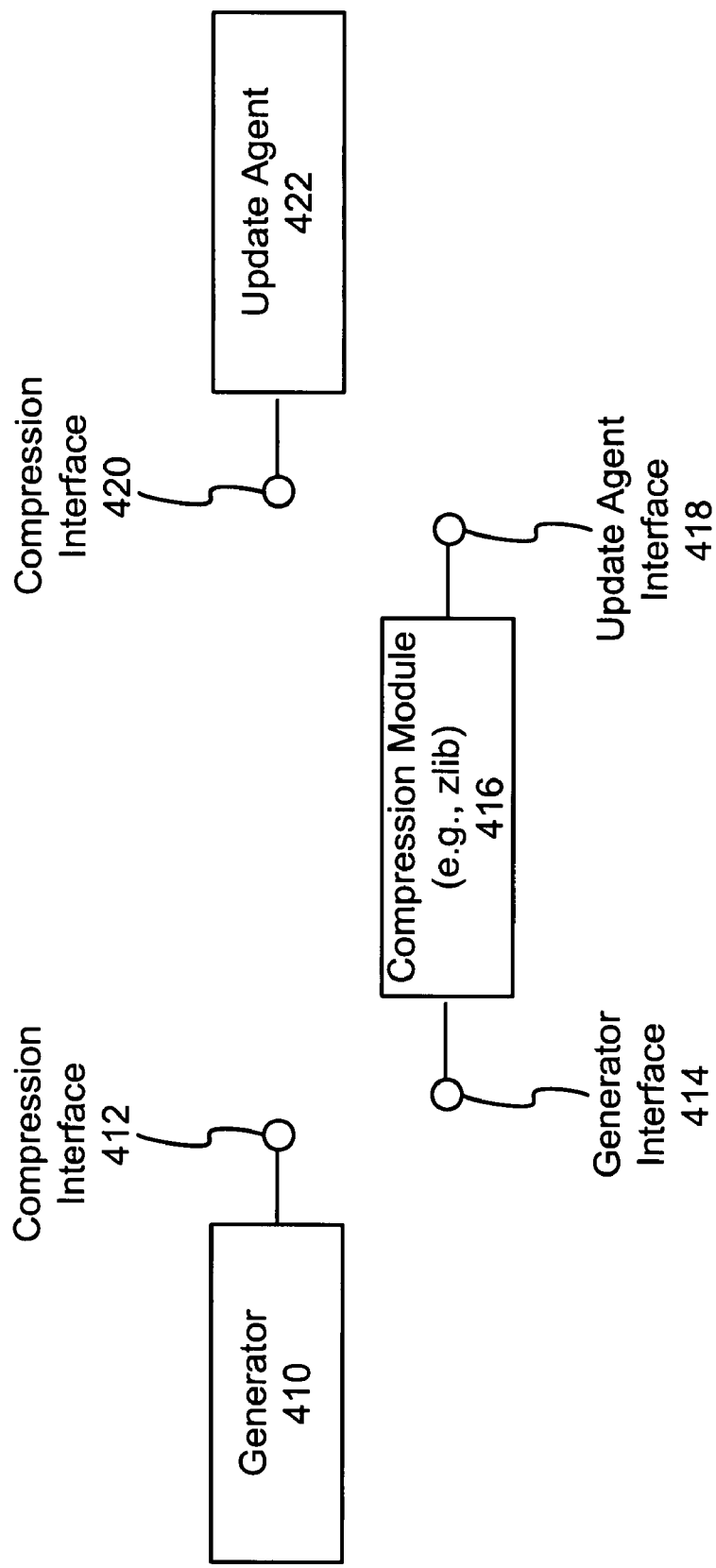
FIG. 4 shows a block diagram illustrating exemplary interfaces that may be used to interface a generator component, a compression module, and an update agent component, in accordance with a representative embodiment of the present invention.

FIG. 4 shows a block diagram illustrating exemplary interfaces 412, 414, 418, 420 that may be used to interface a generator component 410, a compression module 416, and an update agent component 422, in accordance with a representative embodiment of the present invention. In a representative embodiment of the present invention, the compression module may, for example, be a part of a static library, or may simply be linked directly with supplied libraries for the update agent component 422, as module source. The interfaces 412, 414, 418, 420 permit a compression module such as, for example, the compression module 416 to be replaced with another compression module that uses any of a variety of compression/decompression algorithms, thus permitting the level of compression to advance as compression algorithms advance in capability. In a representative embodiment of the present invention, the use of compression interfaces 412, 420 permits compatible algorithms to be used in the generator and update agent components 410, 422. Checks may be performed in the generator component 410 and update agent 422 to verify that compressed and decompressed firmware information is correct, and that the compression/decompression algorithms of the generator 410 and update agent 422 function compatibly. A representative embodiment of the present invention may signal an error if the checks fail.

In a representative embodiment of the present invention, the executable version of the compression module 410 may take the raw binary data of an updated memory image for an electronic device (e.g., electronic device 107), as it will exist in the electronic device during execution, and may create individually compressed blocks of data that will be stored in the non-volatile memory (e.g., flash-type memory) of the electronic device.

Figure 5:
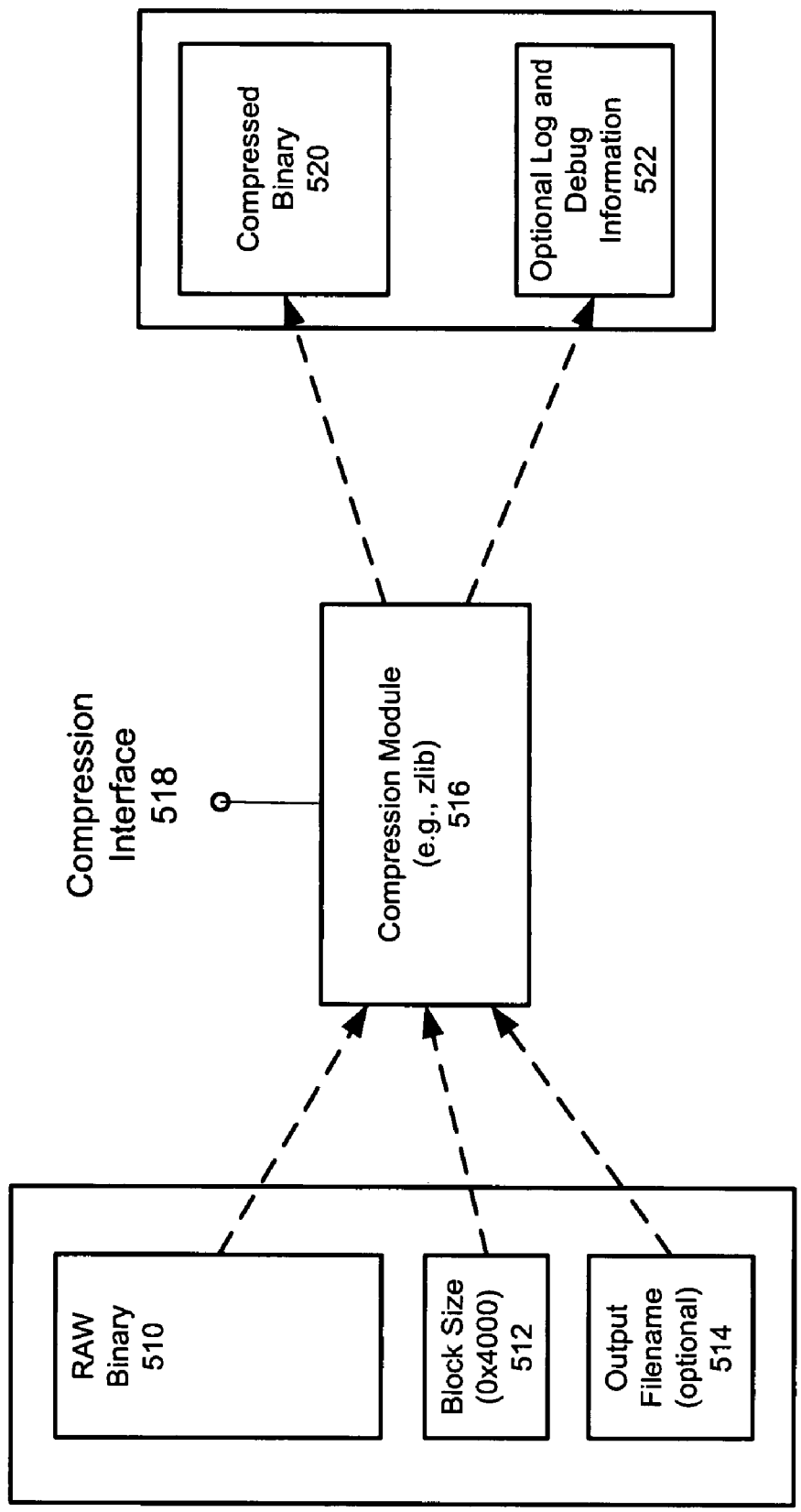
FIG. 5 shows a block diagram illustrating the inputs and outputs of an exemplary compression module that may correspond to, for example, the compression module of FIG. 4, in accordance with a representative embodiment of the present invention.

FIG. 5 shows a block diagram of illustrating the inputs and outputs of an exemplary compression module 516 that may correspond to, for example, the compression module 416 of FIG. 4, in accordance with a representative embodiment of the present invention. As shown in FIG. 5, the compression module 516 may take a raw binary image 510, a block size 512, and an optional output filename 514 as inputs. The compression module 516 may use a compression algorithm such as, for example, one compatible with a compression technique known by the name "zlib", to produce as outputs, a compressed binary image 520 composed of individually compressed data blocks and, optionally, log and debug information 522. The compression interface 518 may be used to couple the compression module 510 to a generator or update agent.

Figure 6:
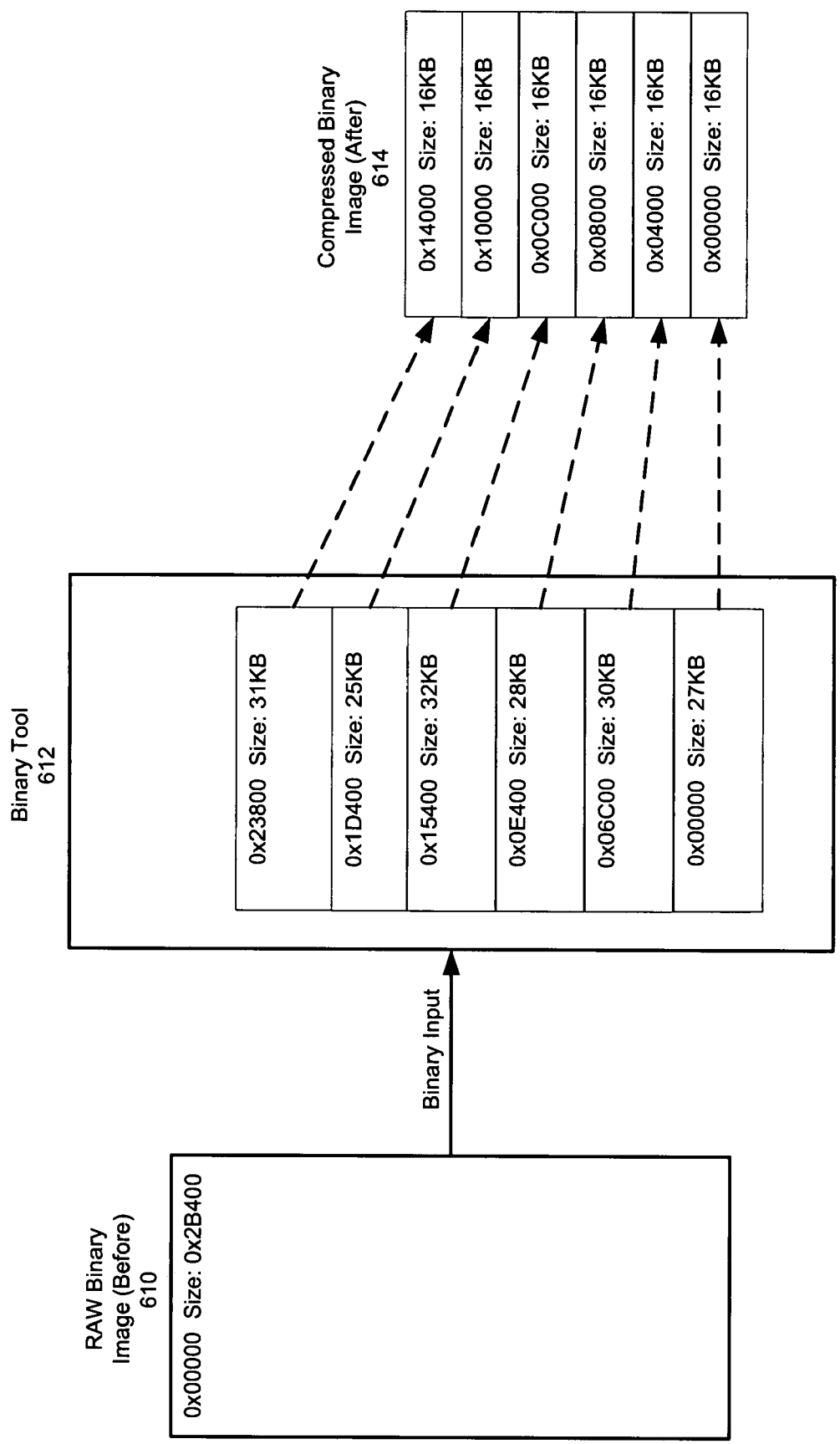
FIG. 6 shows a block diagram graphically illustrating an exemplary process of compressing a raw binary image to produce a compressed binary image using a binary tool, in accordance with a representative embodiment of the present invention.

FIG. 6 shows a block diagram graphically illustrating an exemplary process of compressing a raw binary image 610 to produce a compressed binary image 614 using a binary tool, in accordance with a representative embodiment of the present invention. The binary tool 612 may employ, for example, the compression module 516 of FIG. 5. The example of FIG. 6 illustrates the use of the binary tool 612 when the block size input parameter 512 of FIG. 5 is set to a value of 0x4000 (4000 hex). As can be seen in FIG. 6, the compressed binary image 614 comprises a plurality of individually de-compressible blocks of compressed information, each 4000 hex bytes in length.

The compression module in a representative embodiment of the present invention may determine how much of the RAW binary image data 610 will fit inside each block of the specified block size. Any left over space at the end of a compressed block may be padded with a specific byte value. This may be done to ensure that the start of each compressed block begins with a compressed group. A binary tool such as, for example, the binary tool 612 may have available a default compression algorithm such as, for example, the algorithm commonly referred to as the "zlib" compression algorithm. Other algorithms may also be employed, without departing from the scope of the present invention.

Figure 7:
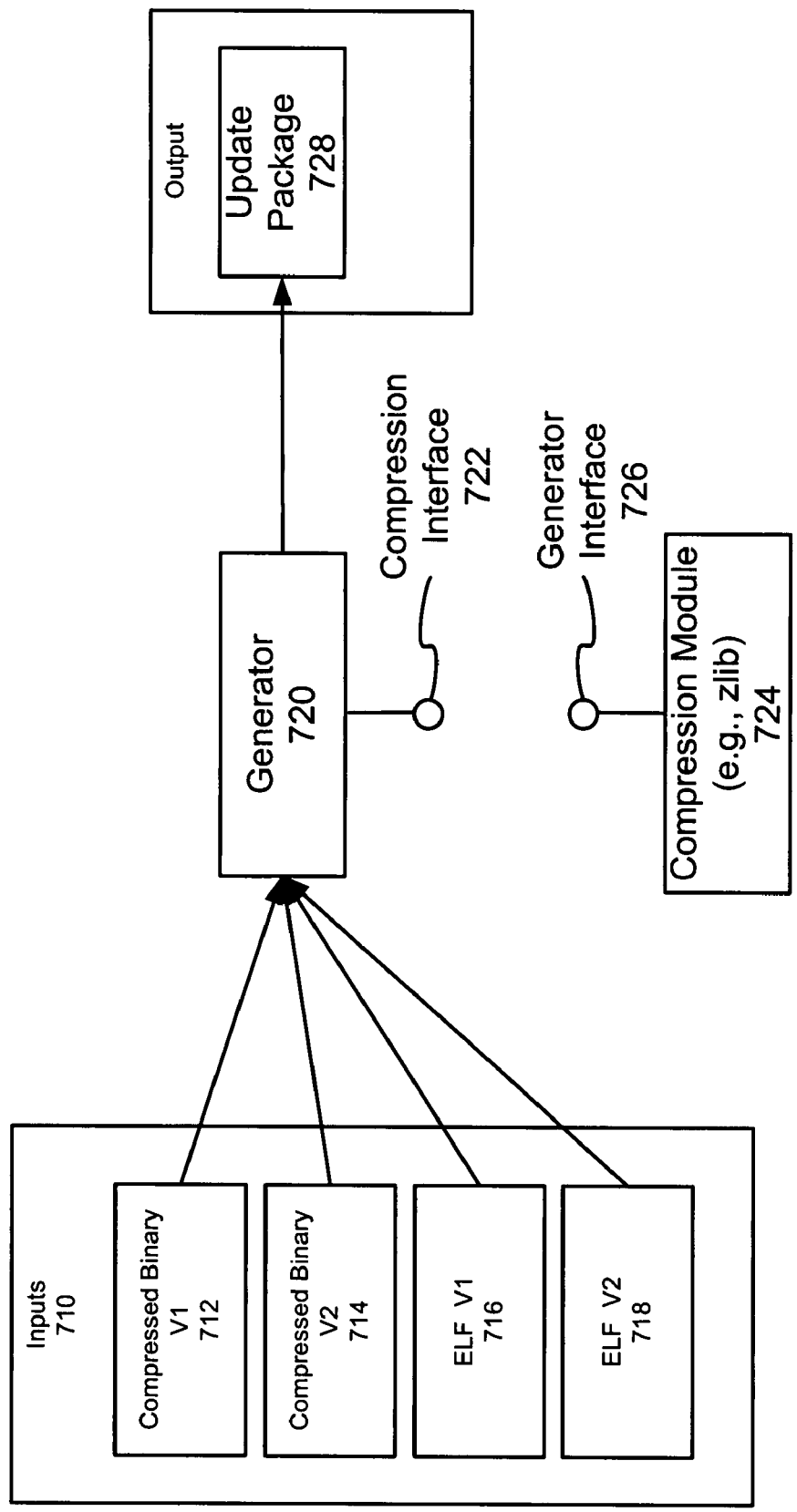
FIG. 7 shows a block diagram graphically illustrating an exemplary process of producing a compressed update package using inputs comprising compressed binary images V1 and V2, in accordance with a representative embodiment of the present invention.

FIG. 7 shows a block diagram graphically illustrating an exemplary process of producing a compressed update package 728 using inputs comprising compressed binary images V1 712 and V2 714, in accordance with a representative embodiment of the present invention. As shown in FIG. 7, a generator 720 may accept as inputs compressed binary images V1 712 and V2 714 and/or ELF-formatted binary images V1 716 and V2 718. An additional parameter for RAM size (not shown) may also be provided to the generator 720. The generator 720 may determine differences between a first/older version V1 712, 716 and a second/updated version V2 716, 718 of firmware/software for an electronic device (e.g., electronic device 107), and encode the differences into the update package 728. The first/older versions V1 712, 716 and the second/updated versions V2 716, 718 of firmware/software for an electronic device may be in compressed form, and it at least part of the functionality of the generator 720 to accept the compressed binary images and produce the update package 728. The generator 720 may make use of a compression module 724 that is compatible with the algorithms used to produce compressed binary images V1 712 and V2 714 to produce the update package 728. The update package 728 may, in some representative embodiments of the present invention, comprise multiple update packages, each for a different portion of the memory of the electronic device and may, in that case, be referred to by the term "update package catalog" or "update package array".

The generator of a representative embodiment of the present invention may produce outputs including, for example, an update package/update package array, logs, and statistics files, based upon options provided by a user of the generator (e.g., the generator 720).

The generator 720 may communicate a memory mapping to an update agent in the electronic device (e.g., the update agent 115 in the electronic device 107 of FIG. 1) via an update package such as, for example, the update package 728, and may produce the update package 728 using information about the amount of available RAM in the electronic device (e.g., the electronic device 107) onto which the update package 728 will be applied. The RAM parameter mentioned above may be used to provide this information to the generator 720.

Figure 8:
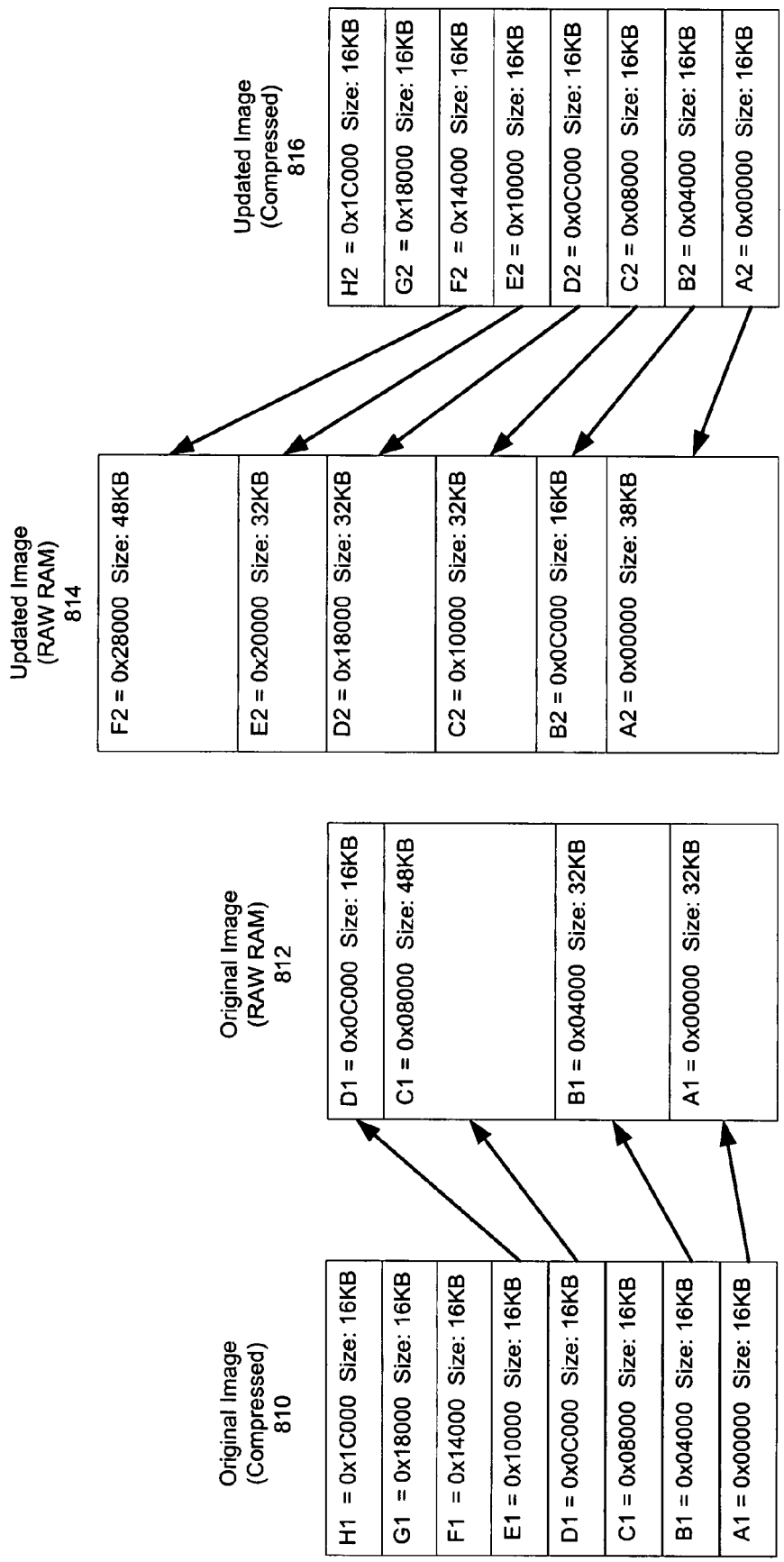
FIG. 8 shows a block diagram graphically illustrating an example of the processing of a compressed binary image by a generator such as, for example, the generator of FIG. 7 to produce an updated compressed binary image, in accordance with a representative embodiment of the present invention.

FIG. 8 shows a block diagram graphically illustrating an example of the processing of original and updated compressed binary images 810, 816 by a generator such as, for example, the generator 720 of FIG. 7, in accordance with a representative embodiment of the present invention. As may be seen in the illustrative example of FIG. 8, the original and updated compressed binary images 810, 816 may comprise multiple compressed blocks. When compressed binary images such as, for example, compressed binary images 810, 816 are used as input to a generator in accordance with a representative embodiment of the present invention, the generator (e.g., the generator 720 of FIG. 7) may use a compressed binary image importer (not shown) to accomplish a mapping of write unit views to both its compressed and uncompressed states. The compressed binary image importer (not shown) may employ a compression module (e.g., the compression module 726) to decompress the blocks of the compressed binary image 810 and compressed updated binary image 816, to produce an original raw binary image 812 and an updated raw binary image 814, respectively. The actual compressed binary image data may be discarded after the generator (e.g., the generator 720 of FIG. 7) gathers information such a, for example, cyclic redundancy (CRC) information and the decompressed data from the compressed binary image 810 and compressed updated binary image 816. A generator such as, for example, the generator 720 of FIG. 7 may then determine difference information from the original raw binary image 812 and updated raw binary image 814, and encode such difference information in the form of transform instructions to be assembled into an update package (e.g., the update package 728 of FIG. 7).

In a representative embodiment of the present invention, a generator such as the generator 720 may determine whether it is possible to perform an update of the current image pair (e.g., original raw binary image 812 and updated raw binary image 814), using a value presented via a RAM size input parameter (e.g., a command line option to the generator 720). If an update is possible, the generator 720 may determine a best-fit source buffer size in RAM, which may be communicated to the update agent in the electronic device (e.g., electronic device 107) via the update package 728. The generator 720 may also take the amount of data that is compressed into consideration when choosing a write unit (e.g., memory block) to destroy, in the case where there are no initial empty write units to shift data into.

While packaging the transform instructions into an update package (e.g. update package 728), the generator 720 may supply a map table as well as new write unit header data that allows the update agent (e.g., the update agent 115 of FIG. 1) to determine when and where to grab source data during the update of the electronic device 107.

The generator of a representative embodiment of the present invention may validate the generated update package (e.g., update package 728) by invoking a validation agent (not shown) upon the created updated package. To insure compatibility, the validation agent may be based upon the same code used to produce the update agent in the electronic device (e.g., the update agent 115 of FIG. 1)

Figure 9:
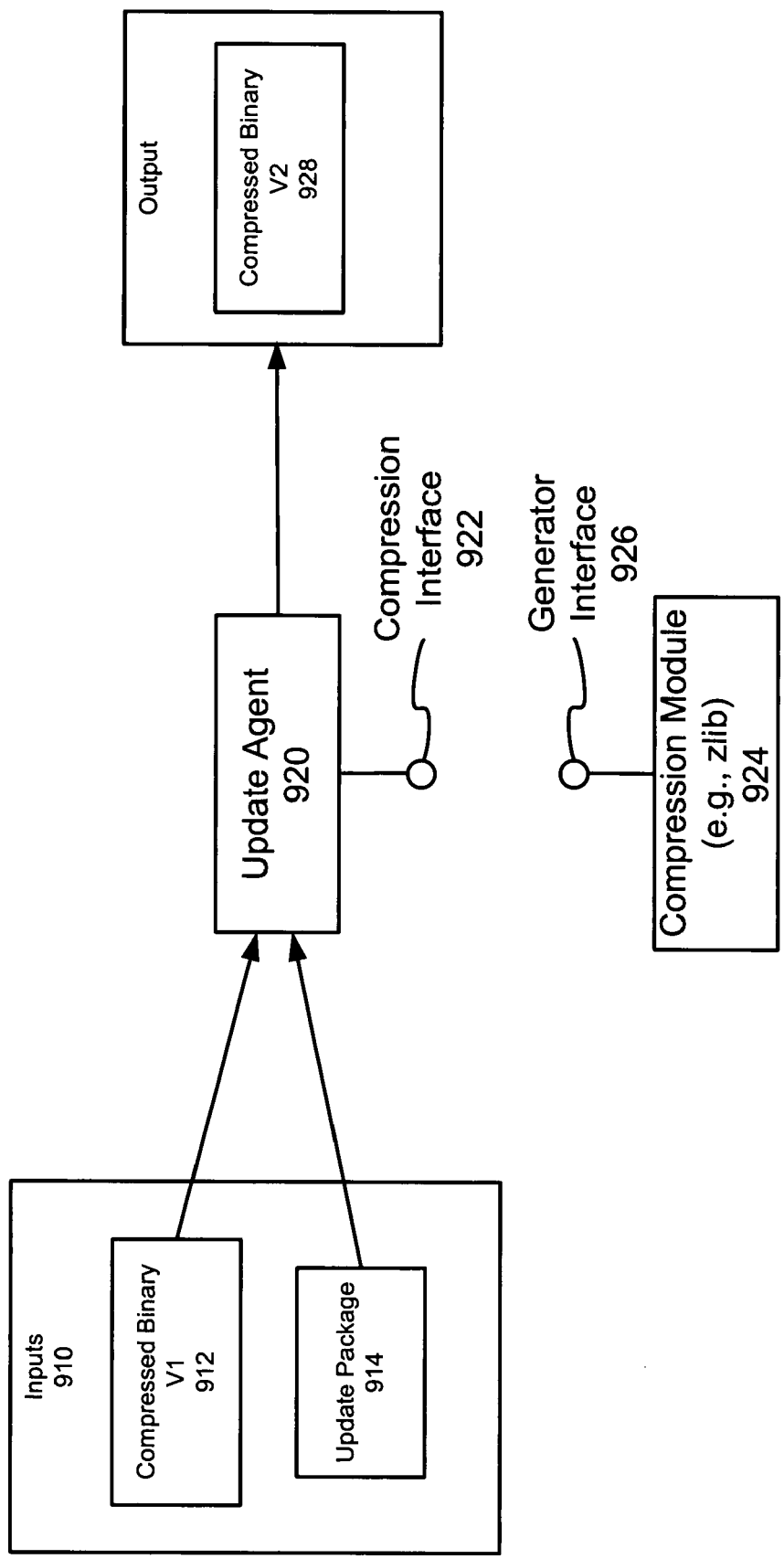
FIG. 9 shows a block diagram graphically illustrating an example of the processing by an update agent of a compressed binary image V1, and an update package created by a generator such as, for example, the generator of FIG. 7, to produce as output an updated compressed binary image V2, in accordance with a representative embodiment of the present invention.

FIG. 9 shows a block diagram graphically illustrating an example of the processing by an update agent 920 of a compressed binary image V1 912, and an update package 914 created by a generator such as, for example, the generator 720 of FIG. 7, to produce as output an updated compressed binary image V2 928, in accordance with a representative embodiment of the present invention. The update agent 920 may correspond to the functionality of, for example, the update agent 115 of FIG. 1. The algorithms and even the source code of the update agent 920 may be used in both the validation agent (not shown) discussed above with respect to the generator 720, and in the update agent used that is used to perform a compressed firmware update on the actual electronic device (e.g., the update agent 115 of the electronic device 107). The update agent 920 of FIG. 9 performs the update of the memory in the electronic device based on the transform instructions provided to it in the update package generated as described above, and the existing content of memory of the electronic device 107.

As illustrated in FIG. 9, during the processing of the compressed binary image V1 912, the update agent 920 may employ a compression module 924 to cause compression and decompression of compressed binary images V1 912 and V2 928. Access to the compression module 924 is afforded using a common compression interface 922 defined for the compression module 924. As described above, the algorithms employed in the compression module 724 used by the generator 720 of FIG. 7 are desirably compatible with the algorithms employed in the compression module 924 used by the update agent 920 of FIG. 9. Although the present discussion makes reference to compatibility with the compression/decompression algorithm commonly known as the "zlib" compression algorithm, any of a wide variety of compression algorithms may be used in the compression modules 724, 924, without departing from the scope of the present invention. It is only necessary that the two compression modules 724, 924 compress and decompress uncompressed and compressed data in substantially the same fashion. If compatibility of the algorithms in the compression modules 724, 924 is not verified, errors in processing of updates may occur. In a representative embodiment of the present invention, the update agent 920 may expect the compressed binary image in memory (e.g., flash memory) to correspond to the compressed version that was put through the generator 720. The update agent in an electronic device (e.g., the update agent 115 of electronic device 107) may verify/validate the contents of an update package produced using the generator 720, by performing an initial survey based on the compressed block CRC's in the update package, before beginning an update.

In a representative embodiment of the present invention, compression and decompression may be invoked by wrapper functions used for reading and writing non-volatile memory (e.g., flash memory). A compression module such as, for example, the compression module 924 of FIG. 9 may be used by wrapper functions that invoke read and write code provided by, for example, the manufacturer of the electronic device (e.g., electronic device 107).

In a representative embodiment of the present invention, a source buffer manager (not shown) may be employed to both cut down on the number of decompressions performed during updating of memory, as well as to manage address translations for source material used during execution of the transformation instructions of the update package. This may be desirable because source material used by transformation instructions of the update package being processed may not be at the expected addresses in RAM. The actual address in the source buffer of data depends upon where in the source buffer data was stored when decompressed.

Figure 10:
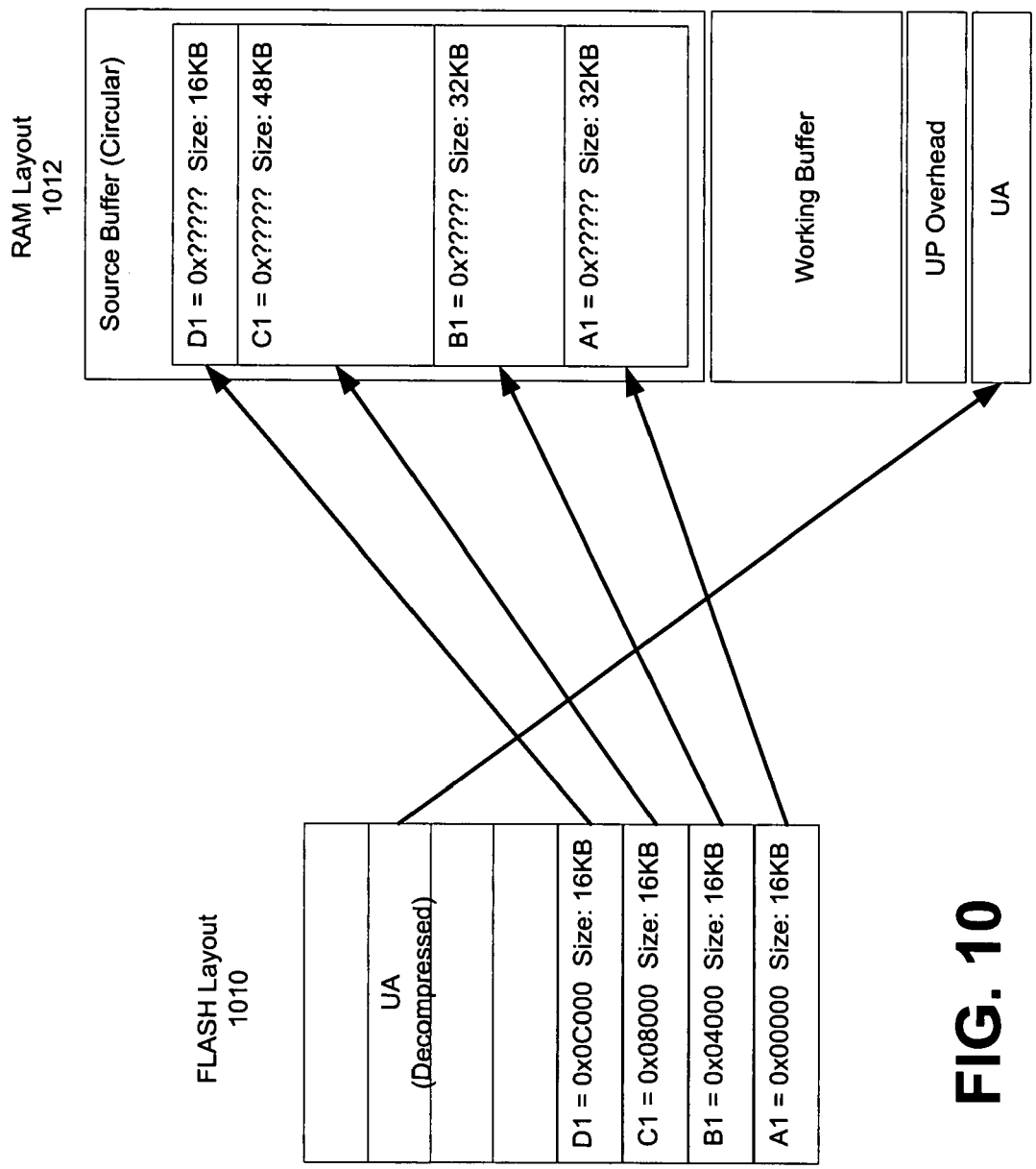
FIG. 10 shows a block diagram graphically illustrating an example of the processing of an update in an electronic device having sufficient RAM (i.e., a large RAM situation) to permit decompression of all source blocks A1, B1, C1, D1 of flash memory into a source buffer in RAM, in accordance with a representative embodiment of the present invention.

FIG. 10 shows a block diagram graphically illustrating an example of the processing of an update in an electronic device having sufficient RAM (i.e., a "large RAM" situation) to permit decompression of all source blocks A1, B1, C1, D1 of flash memory layout 1010 into source buffer 1012 in RAM, in accordance with a representative embodiment of the present invention.

As shown in FIG. 10, it is possible for the update to take place in an optimal manner in an electronic device with sufficient RAM to store all of the source data (e.g., A1, B1, C1, D1) along with the update agent and required working buffers, because repeated decompression and overwriting of uncompressed source information in the source buffer 1012 is avoided. Once a compressed source block A1, B1, C1, D1 in non-volatile memory (e.g., flash memory 1010) is decompressed and placed in the source buffer 1012, it may then be used by the update agent (e.g., update agent 115) in processing transformation instructions of the update package, to produce updated memory blocks. It may be the responsibility of the source buffer manager, discussed above, to track where in the source buffer 1012 each block of compressed data is placed when decompression occurs. The source buffer manager may provide the correct data from the source buffer, based on the address of the source data requested, and information identifying where in the source buffer decompressed source data is placed.

Figure 11:
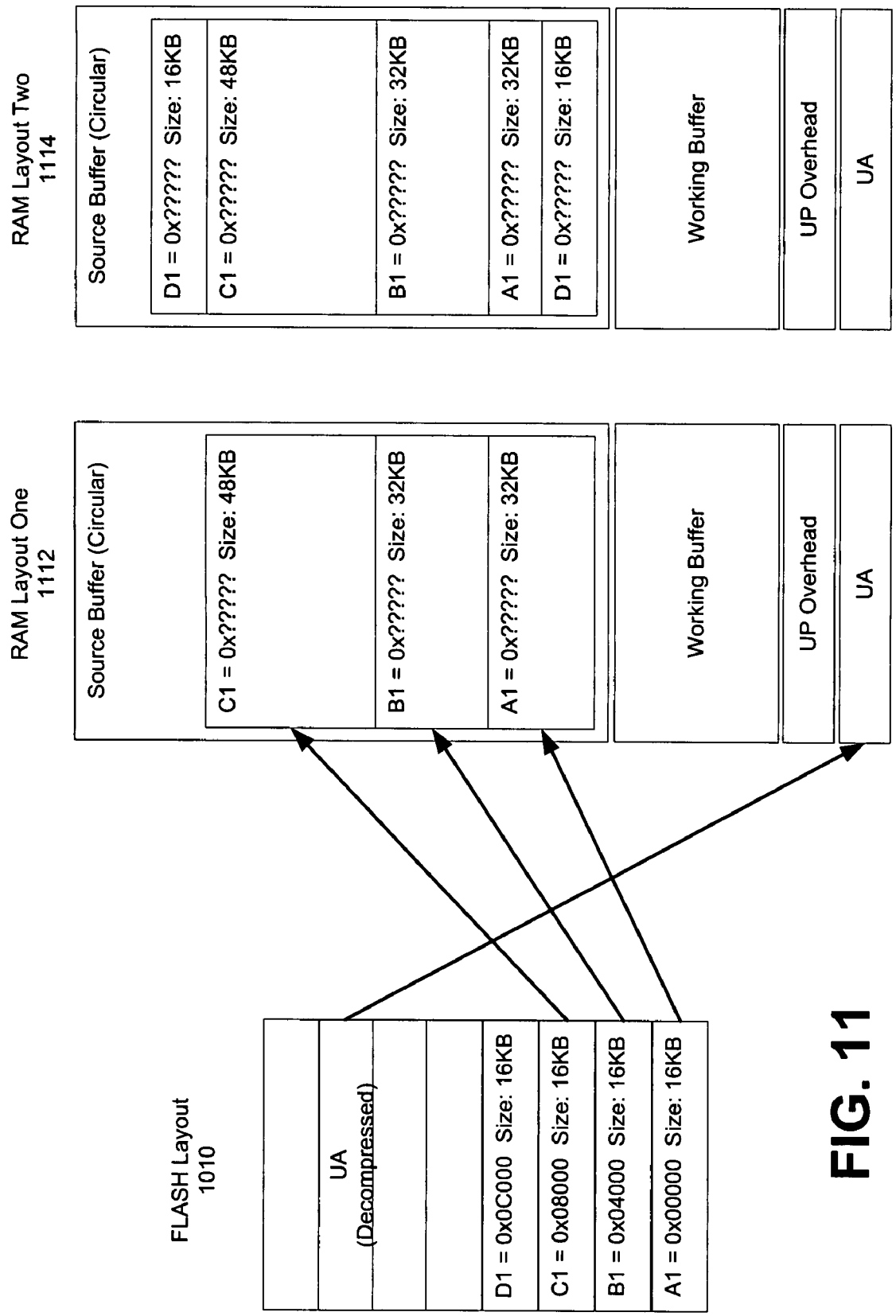
FIG. 11 shows a block diagram graphically illustrating an example of the processing of an update in an electronic device having insufficient RAM (i.e., a limited RAM situation) to allow decompression of all source blocks A1, B1, C1, D1 of flash memory into a source buffer shown as RAM layout one and RAM layout two, in accordance with a representative embodiment of the present invention.

FIG. 11 shows a block diagram graphically illustrating an example of the processing of an update in an electronic device having insufficient RAM (i.e., a "limited RAM" situation) to allow decompression of all source blocks A1, B1, C1, D1 of flash memory 1110 into source buffer shown as RAM layout one 1112 and RAM layout two 1114, in accordance with a representative embodiment of the present invention. In the illustration of FIG. 11, RAM layout one 1112 shows that during processing of an update package, the compressed memory blocks A1, B1, C1 of flash memory 1110 have been decompressed into the source buffer of RAM layout one 1112, to be used as source material in the processing of transformation instructions by an update agent of the electronic device (e.g., the update agent 115 of electronic device 107). At some point, the update processing progresses so that the contents of compressed block D1 is needed as source data by a transformation instruction of the update package. In a limited RAM situation, insufficient RAM exists in the electronic device to decompress compressed block D1 without overwriting previously uncompressed source data. As show in FIG. 11, the compressed block D1 may be decompressed into the circular source buffer of shown in RAM layout 1114, overwriting a portion of previously decompressed source data A1. Although the illustration of FIG. 11 shows the splitting of block D1 in RAM layout two 1114, other representative embodiments of the present invention may keep the decompressed copies of compressed blocks (e.g., D1) intact/whole when they are stored in the source buffer, and may overwrite, for example, all of the block labeled A1.

In an electronic device (e.g., electronic device 107) in which there is not enough RAM to concurrently store all of the decompressed source data along with the update agent and working buffers, the amount of time required to perform a given update may be affected based on the amount of RAM available. This is because, as described above, previously decompressed source data in the circular source buffer may be overwritten to decompress other source data not currently in the source buffer. In a representative embodiment of the present invention, the source buffer itself may be a circular buffer, and the first decompressed data to get written into the source buffer may be the first decompressed data that will be overwritten when wrapping occurs (i.e., when new decompressed source data is needed).

The operation of the source buffer used in a representative embodiment of the present invention (e.g., the source buffer of RAM layouts 1112, 1114) may be automatically adjusted based on the amount of memory available on the device. A generator such as, for example, the generator 720 of FIG. 7 used to produce an update package for updating an electronic device may determine how large the source buffer used by the update agent (e.g., update agent 115) will be. This source buffer size may be based upon RAM size information for the electronic device being updated. That information may be provided by a user of the generator 720. If the amount of RAM available in the electronic device to be updated is more than enough to decompress all compressed source blocks, the generator may set the source buffer size in the RAM of the electronic device as the total decompressed size of the source blocks necessary to perform the update. Otherwise, the generator may first determine whether there is sufficient RAM in the electronic device (e.g., the electronic device 107) to support a "worst case scenario", and then select the largest source buffer size possible, based on the amount of RAM in the electronic device. The "worst case scenario" may be defined as that situation where there is so little available RAM that only one decompressed source block may be held in the source buffer at any one time. If object ordering in a binary image pair (e.g., original and updated binary images 810, 816 of FIG. 8) is not well controlled and lots of scrambling has occurred, then this worst-case scenario may take quite some time to update due to the fact that some source blocks may have to be decompressed more than once. In a well maintained binary image pair, this scenario may show little or no change at all from the optimal time, due to the fact that the source needed to perform the update would be accessed in a linear fashion.

Figure 12:
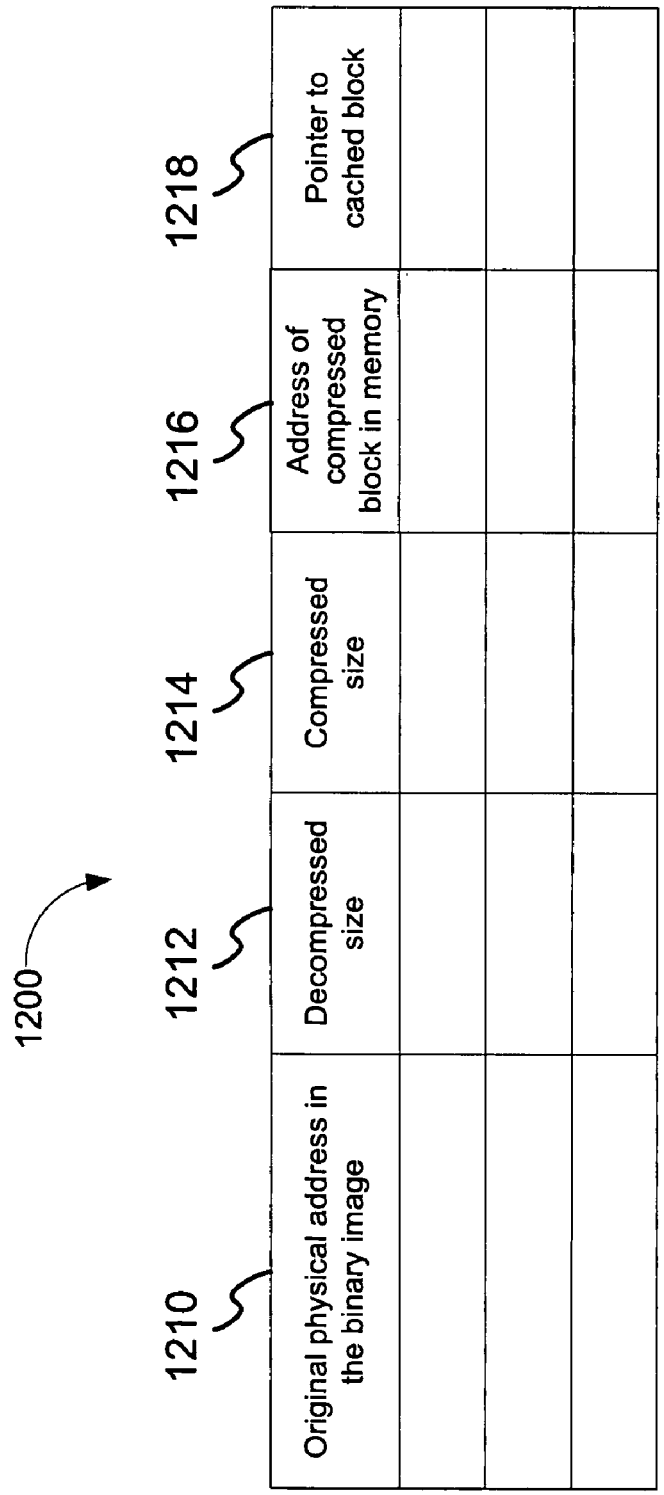
FIG. 12 shows a exemplary table that may be employed by a caching component of an update agent such as, for example, the source manager described above with respect to the processing of compressed firmware blocks, in accordance with a representative embodiment of the present invention.

FIG. 12 shows a exemplary table 1200 that may be employed by a caching component of an update agent such as, for example, the source manager described above with respect to the processing of compressed firmware blocks, in accordance with a representative embodiment of the present invention. The table 1200 illustrated in FIG. 12 comprises one row per block of the compressed binary image.

A representative embodiment of the present invention may handle binary images that have been compressed into equal-sized blocks, any one of which may be decompressed independently from the others. A described above, a compatible generator and update agent such as, for example, the generator 720 of FIG. 7 and update agent 920 of FIG. 9 may each comprise a compression module that performs compression and decompression based on a standard zlib compatible compression library. It should be noted that equal-sized blocks in the original binary image may not be equal-sized in a compressed image.

In a representative embodiment of the present invention, a generator such as, for example, the generator 720 may produce transformation instructions to update an uncompressed first version of firmware V1 to an uncompressed second version of firmware V2. The generator 720 may be aware of variable-sized uncompressed blocks, so that it is able to support fault-tolerant updates. For example, a generator in accordance with a representative embodiment of the present invention may know what V1 source material is still available in RAM at any given time.

As described above, a component of an update agent such as, for example, the source manager of the update agent 920 may keep a cache (i.e., circular source buffer) of uncompressed V1 blocks in RAM. The update agent 920 may update one block of the compressed binary image V1 at a time. The update agent 920 may execute each "copy" transformation instruction from an update package by copying data identified in the copy instruction from a location in a particular decompressed block of the compressed binary image V1, which may be stored in the cache. The source manager may first load and decompress the desired block of the compressed binary image into the cache (i.e., source buffer), if the identified location is not present in the cache (i.e., source buffer). A purpose of the cache (i.e., source buffer) is to reduce the number of times that each compressed block of the binary image V1 gets decompressed. Without the cache (i.e., source buffer), the update agent 920 may desirably decompress a particular compressed block of the compressed binary image V1 for every single copy instruction that references that block of the compressed binary image V1.

In a representative embodiment of the present invention, the update agent may keep a table of data such as, for example, the table 1200 of FIG. 12, with one row of the table 1200 for each block of the compressed binary image V1. The leftmost column 1210 may contain the original physical address of the block in the binary image V1, and the table 1200 may be sorted based on the leftmost column 1210. The second column 1212 may contain the decompressed size of the compressed binary image block, while the third column 1214 from the left may contain the compressed size of the block. The fourth column 1216 may contain the address of the compressed block in memory of the electronic device, and the rightmost column 1218 may contain a null (i.e., all zeroes) pointer, if the corresponding block is not present in the cache (e.g., the source buffer 1112), or the address of the block in the source buffer (i.e., cache) if the compressed block has already been decompressed and is currently stored in the source buffer.

An update agent in a representative embodiment of the present invention (e.g., the update agent 920) may process a "copy" transformation instruction from an update package as follows. If the next transformation instruction in the update package indicates that S bytes are to be copied from location L in the binary image V1, the update agent (i.e., a cache or source manager component) may search the leftmost column 1210 of table 1200 to identify the largest address smaller than L. This search may, for example, employ a binary search algorithm. Note that the address L may be expected to exist within the block that corresponds to this entry of the table 1200, because table 1200 contains entries for all of the blocks in the binary image V1. If location L is in a cached block (i.e. the rightmost column 1218 is not a null pointer), the block containing the address L has been found, and is located in a block located in the cache (i.e., source buffer) at the following address:

(pointer to cached block)+[L−(original physical address of that block)]

If the compressed block containing L isn't already decompressed and cached, then the cache/source manager component of the update agent may load the needed block into cache/source buffer as follows. If there is enough room in the cache/source buffer to load the block containing L after the most-recently loaded block in the buffer, then the new block may be decompressed and loaded into the cache/source buffer after the most recently loaded block. The rightmost column 1218 in the entries of any blocks that the new block overwrites are set to null, to indicate that those uncompressed blocks are no longer loaded and available. Overwriting earlier loaded blocks may be unnecessary until the buffer fills up at least once since until then, the space between the most-recently loaded block and the end of the buffer is empty.

If there is not enough room in the cache/source buffer to load the block containing L after the most-recently loaded block in the buffer, the new block is loaded at the beginning of the cache, the rightmost column 1218 in the entries of any blocks that the new block overwrites are set to null, to indicate that those blocks are no longer loaded and available. In a representative embodiment of the present invention, the generator may ensure that the cache/source buffer is always large enough for this to be possible.

In addition to the support for compressed firmware update described above, a representative embodiment of the present invention may also support updating of a compressed read-only memory (ROM) file system, and the ability to update an update agent such as, for example, the update agent 115 of FIG. 1.

A representative embodiment of the present invention may comprise a gap optimizer tool (GOT) to re-compress and re-organize a compressed ROM file system (CRAMFS), a CRAMFS generator to generate update packages for updating a original/first CRAMFS to an updated/second CRAMFS, and a CRAMFS firmware packager to combine a CRAMFS update package and a firmware update package into a single update package. These tools may be configured to run on an operating system such as the Microsoft Windows XP operating system on an Intel Pentium-based personal computer, for example. The CRAMFS generator may employ elements of the Java Development Kit version 1.4.2 from Sun Microsystems.

A compressed ROM file system (CRAMFS) may not support execute in place (XIP), and the start address of a compressed ROM file system in flash-type memory may be fixed during the lifecycle of an electronic device model. The end address of a compressed. ROM file system may be at a write unit boundary, and only one compressed ROM file system in the electronic device may need to be updated.

The generation of an update package in accordance with a representative embodiment of the present invention may involve a three step process.

Figure 13:
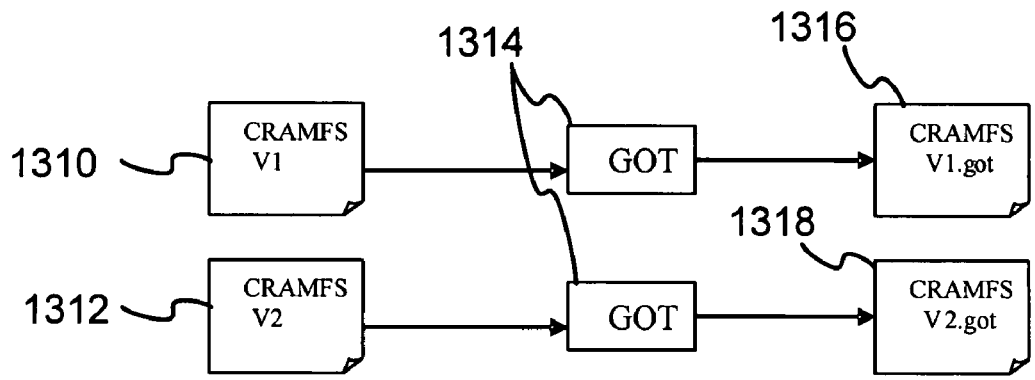
FIG. 13 shows a block diagram of an exemplary first pre-processing step in the production of a combined update package for updating both firmware and a compressed ROM file system, in accordance with a representative embodiment of the present invention.

FIG. 13 shows a block diagram of an exemplary first pre-processing step in the production of a combined update package for updating both firmware and a compressed ROM file system, in accordance with a representative embodiment of the present invention. As shown in FIG. 13, first and second files CRAMFSV1 1310 and CRAMFSV2 1312 of first and second versions V1 and V2 of a compressed ROM file system may be provided as input to a gap optimization tool 1314, which produces files CRAMFSV1.got and CRAMFSV2.got. In a representative embodiment of the present invention, a gap optimization tool such as, for example, the gap optimization tool 1314 may recompress and re-organize the CRAMFS image and may keep the compressed ROM file system identical with the original file system when the compressed ROM file system is mounted by an operating system such as, for example, the OS 119 of FIG. 1. Each compressed ROM file system image may be pre-processed by the gap optimization tool, and the pre-processed CRAMFS image may be programmed into memory in an electronic device such as, for example, the electronic device 107 of FIG. 1.

Figure 14:
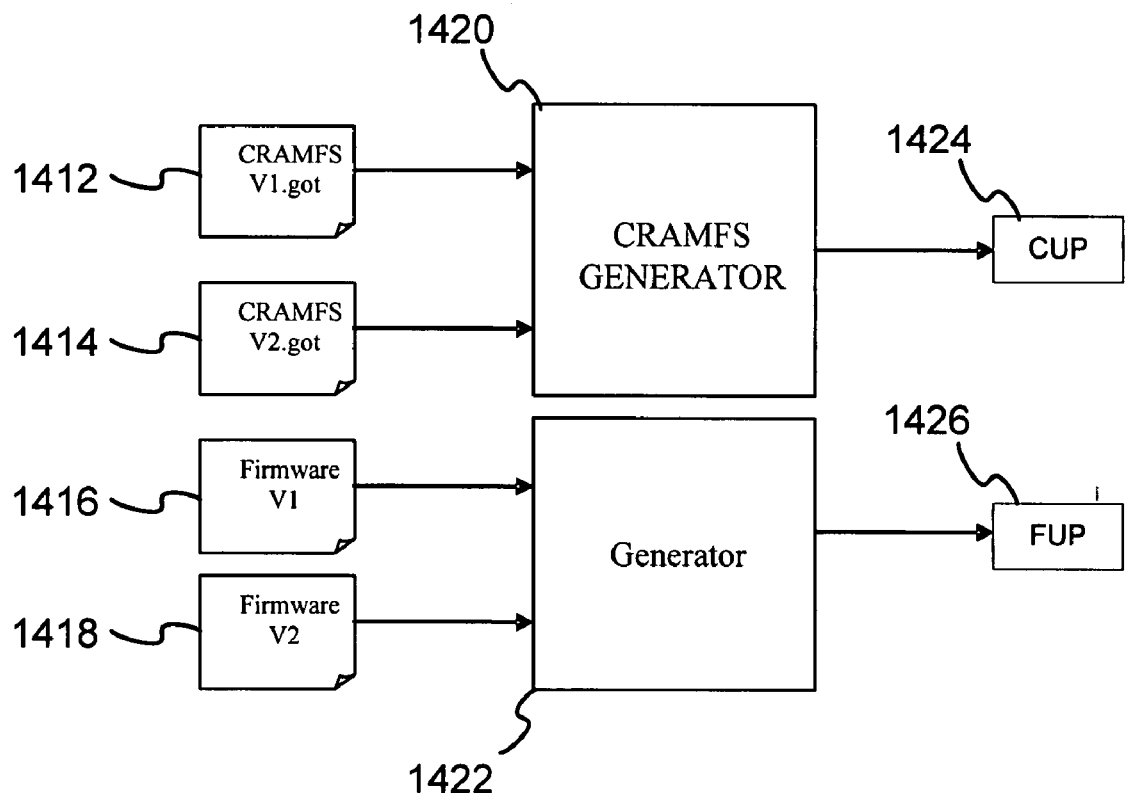
FIG. 14 shows a block diagram of an exemplary second update package calculation step in the production of a combined update package for updating both firmware and a compressed ROM file system, in accordance with a representative embodiment of the present invention.

FIG. 14 shows a block diagram of an exemplary second update package calculation step in the production of a combined update package for updating both firmware and a compressed ROM file system, in accordance with a representative embodiment of the present invention. As shown in FIG. 14, first and second files CRAMFSV1.got 1412 and CRAMFSV2.got 1414 may be provided as input to CRAMFS generator 1420, which produces a CRAMFS update package (CUP) 1424. The CRAMFS generator 1420 may calculate the content of an update package between two CRAMFS images, if a CRAMFS update is needed in an electronic device (e.g. the electronic device 107). In addition, first and second firmware versions V1 1416 and V2 1418 may be provided as input to a firmware update package generator 1422, which produces as output a firmware update package 1426. The firmware update package generator 1422 may be used to calculate a firmware update package using two firmware images, if a firmware update is needed in the electronic device (e.g., electronic device 107). The firmware update package generator 1426 may correspond to, for example, the generator 720 of FIG. 7.

Figure 15:
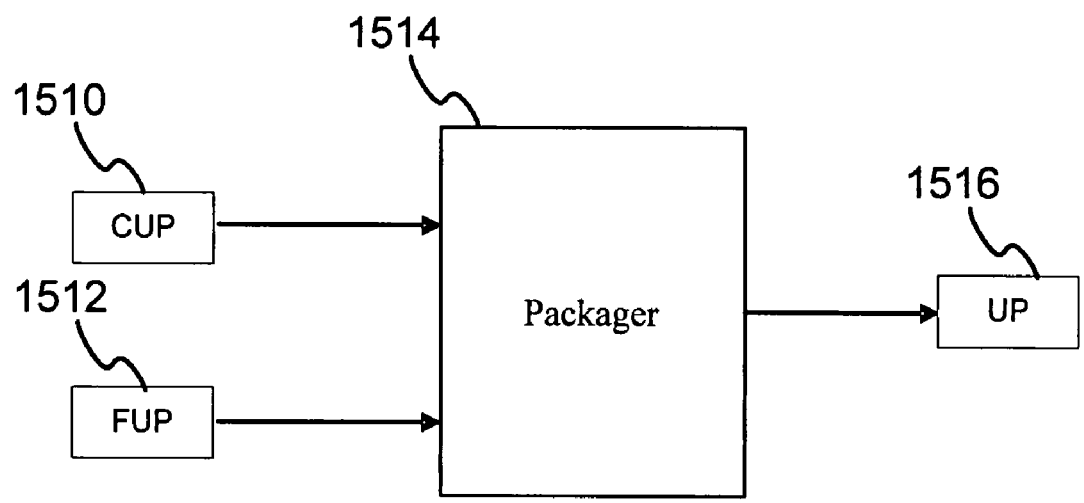
FIG. 15 shows a block diagram of an exemplary third update packaging step in the production of a combined update package for updating both firmware and a compressed ROM file system, in accordance with a representative embodiment of the present invention.

FIG. 15 shows a block diagram of an exemplary third update packaging step in the production of a combined update package for updating both firmware and a compressed ROM file system, in accordance with a representative embodiment of the present invention. As shown in FIG. 15, a CRAMFS update package (CUP) 1510 that may correspond to, for example, the CRAMFS update package 1424 of FIG. 14, and a firmware update package (FUP) 1512 that may correspond to, for example, the firmware update package 1426 of FIG. 14, may be provided as input to packager 1514, which produces as output a combined update package UP 1516. In a representative embodiment of the present invention, the combined update package 1516 may be processed in an electronic device (e.g., the electronic device 107) as an update package array by a hand-off module such as, for example, the hand-off module 121 of FIG. 1, as described above.

A gap optimization tool (GOT) in accordance with a representative embodiment of the present invention may be a command line program that may accept the options shown in Table 1, below.

TABLE 1

| Key Parameter | Description |
| --- | --- |
| -h | Print help information |
| -i imgFile | Specify the absolute path of CRAMFS image to be pre-processed |
| -f confFile | Specify the absolute path of the file contains settings to instruct GOT perform re-organize. Detail information on the settings is described in the following section. |

TABLE 1-continued

| Key Parameter | Description |
| --- | --- |
| -o outputImg | Specify the absolution path for outputting the processed CRAMFS image. |

A representative embodiment of the present invention may accept a number of options in the file "confile", that may be provided using the "-f" option, shown above. Table 2 shows a list of settings that may be provided in "confile".

TABLE 2

| Item | Description |
| --- | --- |
| BLOCK_SIZE | May be used to specify the write unit size, and may be a multiple of the hardware block size. |
| CRAMFS_SIZE | May be used to specify the size of flash reserved for CRAMFS on the electronic device, and may be greater than or equal to the size of original CRAMFS image file |
| GAP_PERCENTAGE | May be used to specify how much free space is to be distributed to the files which are predicted to have a greater probability of change in future versions. Values set for this option may be in the range of 0 to 100. |
| PREDICT_CHANGE_FILES | May be used to identify files which are predicted to have a greater probability of change in future versions. The value set for this option may be the full path of the file when CRAMFS image is mounted at the root of the file system ("/"). If a directory path is specified, all files under the directory and its sub-directory may be treated as PREDICT_CHANGE_FILES. This option may be set zero or multiple times. Files not set in PREDICT_CHANGE_FILES may be treated as PREDICT_UNCHANGE_FILES. |
| PREDICT_UNCHANGE_FILES | May be used to identify files that are predicted to have little probability of change in future versions. The value set for this option may be the full path of the file when CRAMFS image is mounted at the root of the file system ("/"). If a directory path is specified, all files under the directory and its sub-directory may be treated as PREDICT_UNCHANGE_FILES. This option may be set zero or multiple times. |

Listing 1 shows an exemplary listing of settings for a gap optimization tool in accordance with a representative embodiment of the present invention.

Listing 1

All lines started with # are treated as comment line. For a comment, # may be the first character in the line.

Specify the write unit size

BLOCK_SIZE=131072

Specify flash reserved size for CRAMFS

CRAMFS_SIZE=25165824

Specify the percentage of gap used for files which have more possibility to be changed in future

Value specified here equals percentage multiple 100

GAP_PERCENTAGE=90

Specify files which are predicted to have more possibility to be changed in future

Multiple items can be specified and value of each item must be a valid path in

CRAMFS when it is mounted at '/'.

If a directory is specified, all files under the directory and its sub-directory are put in the category.

PREDICT_CHANGE_FILES=/usr/lib

PREDICT_CHANGE_FILES=/lib

Specifies files which are predicted to seldom be changed in future.

Multiple items can be specified and value of each item must be a path in CRAMFS when it is mounted at '/'.

If a directory is specified, all files under the directory and its sub-directory are put in the category.

PREDICT_UNCHANGED_FILES=/usr/lib/fonts

PREDICT_UNCHANGED_FILES=/lib/std_c_libs

PREDICT_UNCHANGED_FILES=/lib/java_libs

A compressed ROM files system generator (CRAMFS generator) in accordance with a representative embodiment of the present invention may be a command line program, which may accept the options shown in Table 3, below.

TABLE 3

| Key Parameter | Description |
| --- | --- |
| -h | Print help information |
| -e exePath | May be used to specify the absolute path for a generator executable such as "generatorGBI.exe". |
| -v1 v1File | May be used to specify the absolute path for base version of CRAMFS image which may be pre-processed by GOT. The input file may include the data in the offset section if CRAMFS is not started from write unit boundary. |
| -v2 v2File | May be used to specify the absolute path for target version of CRAMFS image which may be pre-processed by GOT. The input file may include the data in the offset section if CRAMFS is not started from write unit boundary. * |
| -b blockSize | May be used to specify the write unit size. The write unit size may be a multiple of the size of hardware block size. |
| -t tempSize | May be used to specify the size for temporary storage during CRAMFS update. The area specified by tmpSize may be accessed by an update agent wrapper functions such as "cuaw_flash_readFromExternalStorage" and "cuaw_flash_writeToExternalStorage". The size may be less than or equal to the size of available external storage size. If there isn't external storage or if the user doesn't want to use external storage, this option may be set to zero. |
| -ofs offset | May be used to specify the CRAMFS offset from write unit boundary. This value may be set to <CRAMFS start address on flash> % write unit size. |
| -o updatePkg | May be used to specify the absolute path for outputting the update package |

In a representative embodiment of the present invention, if CRAMFS is not started from a write unit boundary in flash memory, the data ahead of CRAMFS in the first write unit may also be included in input file, i.e. the input file may be exactly the image from the first write unit to the last one involved with CRAMFS. The difference of the offset-data between base version and target version may also be calculated, and may be updated by the update agent.

In a representative embodiment of the present invention, when generating an update package for firmware, the space occupied by a compressed ROM file system (CRAMFS) may be placed/reserved in an "exclude zone". If the size of a CRAMFS is the same in the base version and the target version, and the CRAMFS is started from a write unit boundary and ended at a write unit boundary, then the write units covered by CRAMFS may be put in an "exclude zone". If the size of a compressed ROM files system (CRAMFS) is the same in the base version and the target version, and the CRAMFS is not started from a write unit boundary and ended at a write unit boundary, the write units involved with CRAMFS may be put in an "exclude zone". If the size of a compressed ROM file system (CRAMFS) is not the same in the base version as in the target version, and CRAMFS is started from write unit boundary and ended at write unit boundary, then the write units covered by smaller CRAMFS may be put in an "exclude zone". Write units covered by a larger CRAMFS and not covered by a smaller CRAMFS may be set to all ones (0XFF) when calculating the update package for firmware.

A packager in accordance with a representative embodiment of the present invention may be a command line program, which may accept the options shown in Table 4, below.

TABLE 4

| Key Parameter | Description |
| --- | --- |
| -h | Print help information |
| -c cramfsPkg | May be used to specify the absolute path for CRAMFS update package (CUP). |
| -f firmwarePkg | May be used to specify the absolute path for firmware update package (FUP). |
| -o outPkg | May be used to specify the absolute path for the final (combined) update package. |

Although a system and method according to the present invention has been described in connection with the preferred embodiment, it is not intended to be limited to the specific form set forth herein, but on the contrary, it is intended to cover such alternative, modifications, and equivalents, as can be reasonably included within the scope of the invention as defined by this disclosure and appended diagrams.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method of updating memory in an electronic device, using a package of update information comprising a plurality of portions for updating a corresponding plurality of types of content in the memory, the method comprising:

using compression/decompression logic, verifying that compressed and decompressed firmware information is correct and compatible and signaling an error if the verification fails;

receiving the package of update information from a remote server via a communication network;

processing each of the plurality of portions of the package of update information with a corresponding one of a plurality of update agents to update the corresponding one of the plurality of types of content in the memory, by transforming existing content into updated content in the electronic device;

identifying a compression/decompression version and validating contents of the package of update information by performing an initial survey based on CRC blocks in the package before beginning an update; and sending to the remote server, via the communication network, information identifying one or both of processed update information and/or an outcome of the processing.

2. The method according to claim 1, wherein processing comprises:

decompressing existing content of a certain type;

updating the decompressed existing content using one of the plurality of portions of update information corresponding to the certain type, to produce updated content;

compressing the updated content; and storing the compressed updated content in the memory.

3. The method according to claim 2, wherein decompressing comprises:

decompressing, into volatile memory, existing content from non-volatile memory, if the existing content is not available in decompressed form in the volatile memory; and accessing decompressed existing content in the volatile memory, if the existing content is available in decompressed form in the volatile memory.

4. The method according to claim 1, wherein the memory comprises non-volatile semiconductor memory.

5. The method according to claim 1, wherein the plurality of types of content comprises compressed firmware.

6. The method according to claim 1, wherein the plurality of types of content comprises a compressed file system.

7. The method according to claim 1, wherein the electronic device comprises one of a cellular phone, a personal digital assistant, a pager, or a handheld personal computer.

8. The method according to claim 1, wherein the package of update information comprises a set of instructions executable by software or firmware in the electronic device to create updated blocks from existing blocks of non-volatile memory.

9. The method according to claim 1, wherein the package of update information is received wirelessly.

10. A mobile electronic device supporting fault tolerant updating of non-volatile memory, the device comprising:
compression/decompression logic configured to be verified for compatibility and correctness of firmware information and for signaling an error if the verification fails;
interface circuitry enabled to wirelessly communicate update information;
at least one processor operably coupled to the interface circuitry and to non-volatile and volatile memory, the non-volatile memory arranged to be written as blocks, the at least one processor operating to, at least;
wirelessly receive a package of update information from a remote server;
process each of a plurality of portions of the package of update information with a corresponding one of a plurality of update agents to update a corresponding type of content in the non-volatile memory, by transforming existing content into updated content;
identify a compression/decompression version and validate contents of the package of update information by performing an initial survey based on CRC blocks in the package before beginning an update; and
wirelessly transmit to the remote server, information identifying one or both of processed update information and/or an outcome of the processing.

11. The device according to claim 10, wherein the at least one processor further operates to:
decompress existing content of a certain type;
update the decompressed existing content using one of the plurality of portions of update information corresponding to the certain type, to produce updated content;
compress the updated content; and
store the compressed updated content in the non-volatile memory.

12. The device according to claim 11, wherein decompression of existing content comprises:
decompressing, into volatile memory, existing content from non-volatile memory, if the existing content is not available in decompressed form in the volatile memory; and
accessing decompressed existing content in the volatile memory, if the existing content is available in decompressed form in the volatile memory.

13. The device according to claim 10, wherein the non-volatile memory comprises a flash-type semiconductor memory.

14. The device according to claim 10, wherein the update information comprises a set of instructions executable by software or firmware in the electronic device to create updated blocks, from existing blocks of non-volatile memory.

15. The device according to claim 10, wherein the electronic device comprises one of a cellular phone, a personal digital assistant, a pager, or a handheld personal computer.

* * * * *

UNITED STATES PATENT AND TRADEMARK OFFICE
CERTIFICATE OF CORRECTION

PATENT NO. : 7,716,414 B2  Page 1 of 1
APPLICATION NO. : 11/732267
DATED : May 11, 2010
INVENTOR(S) : Marko Slyz et al.

It is certified that error appears in the above-identified patent and that said Letters Patent is hereby corrected as shown below:

In column 21, line 15, in Claim 10, delete "least;" and insert -- least: --, therefor.

Signed and Sealed this

Thirty-first Day of August, 2010

David J. Kappos
*Director of the United States Patent and Trademark Office*